(12) United States Patent
Bhatia et al.

(10) Patent No.: US 9,467,400 B2
(45) Date of Patent: Oct. 11, 2016

(54) MANAGING UNAVAILABILITY NOTICES

(71) Applicant: INTERNATIONAL BUSINESS MACHINES CORPORATION, Armonk, NY (US)

(72) Inventors: Supreet K. Bhatia, Pune (IN); Girish Padmanabhan, Pune (IN); Rajesh Patil, Pune (IN); Prasad P. Purandare, Pune (IN); Hina Purohit, Pune (IN); Paryushan P. Sarsamkar, Pune (IN); Jaitirth V. Shirole, Pune (IN)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 14/317,377

(22) Filed: Jun. 27, 2014

(65) Prior Publication Data
US 2015/0381532 A1 Dec. 31, 2015

(51) Int. Cl.
| | | |
|---|---|---|
| *G06F 15/16* | (2006.01) | |
| *H04L 12/58* | (2006.01) | |
| *G06F 3/0484* | (2013.01) | |
| *G06F 3/00* | (2006.01) | |

(52) U.S. Cl.
CPC ........... *H04L 51/02* (2013.01); *G06F 3/04842* (2013.01)

(58) Field of Classification Search
CPC ... G06Q 10/107; H04L 12/585; H04L 12/58; H04L 12/581
USPC ......................................................... 709/206
See application file for complete search history.

(56) References Cited

U.S. PATENT DOCUMENTS

| | | |
|---|---|---|
| 5,930,337 A | 7/1999 | Mohler |
| 6,442,589 B1 | 8/2002 | Takahashi et al. |
| 7,984,105 B2 | 7/2011 | Griffin |
| 8,346,879 B2 | 1/2013 | Meunier et al. |

(Continued)

FOREIGN PATENT DOCUMENTS

| | | |
|---|---|---|
| CA | 2793997 A1 | 1/2013 |
| EP | 1681651 A1 | 7/2006 |

(Continued)

OTHER PUBLICATIONS

IBM. "Leveraging Out-of-Office Information Capabilities". IP.com No. IPCOM000182014D. IP.com Original Publication Date: Apr. 22, 2009. IP.com Electronic Publication: Apr. 22, 2009.

(Continued)

*Primary Examiner* — Chris Parry
*Assistant Examiner* — Alan S Chou
(74) *Attorney, Agent, or Firm* — John W. Hayes; William H. Hartwell

(57) ABSTRACT

A computer-implemented method, carried out by one or more processors, for managing unavailability notices. In an embodiment, the method comprises the steps of initializing an out of office notice, wherein the out of office notice is associated with a first user of an e-mail service; receiving inputs for the out of office notice, wherein the inputs include one or more of: a duration of time selection, alternative contact information, and message content; receiving a list of one or more user to whom to send an out of office alert notice with the received inputs; and sending to the one or more users from the list the out of office alert notice with the received inputs and a reminder function, wherein the reminder function allows for each of the one or more users to receive a reminder about unavailability at another time.

15 Claims, 5 Drawing Sheets

(56) References Cited

U.S. PATENT DOCUMENTS

| | | |
|---|---|---|
| 8,495,501 B2 | 7/2013 | Kadashevich et al. |
| 2008/0040177 A1 | 2/2008 | Vuong et al. |
| 2008/0104175 A1 | 5/2008 | Keohane et al. |
| 2008/0104177 A1* | 5/2008 | Keohane ............... G06Q 10/107 709/206 |
| 2008/0127231 A1* | 5/2008 | Shaffer ................ G06Q 10/109 719/328 |
| 2008/0133302 A1 | 6/2008 | Brauninger et al. |
| 2009/0007143 A1 | 1/2009 | Chang et al. |
| 2009/0150500 A1 | 6/2009 | Kumar et al. |
| 2010/0250682 A1* | 9/2010 | Goldberg ............. G06Q 10/107 709/206 |
| 2011/0231371 A1 | 9/2011 | Logan et al. |
| 2013/0031184 A1* | 1/2013 | Avitabile ............. G06Q 10/109 709/206 |

FOREIGN PATENT DOCUMENTS

| | | |
|---|---|---|
| EP | 2355016 A1 | 8/2011 |
| EP | 2363984 A2 | 9/2011 |
| EP | 2538625 A2 | 12/2012 |

OTHER PUBLICATIONS

IBM. "Mail server sends an out of office notification to the sender if a receiver is in holidays". IP.com No. IPCOM000180529D. IP.com Original Publication Date: Mar. 11, 2009. IP.com Electronic Publication: Mar. 11, 2009.

"Proactively Updating Recipient's Status to Feed an Out-of-office Aware Email System". IP.com No. IPCOM000197288D. IP.com Electronic Publication Date: Jul. 1, 2010.

"Send Out of Office notices automatically with an Exchange account-Outlook". [online][Retrieved on May 13, 2014]. <http://office.microsoft.com/en-in/outlook-help/send-out-of-office-notices-automatically-with-an-exchange-account-HP001232830.aspx>. Copyright 2014 Microsoft.

"Sender based dynamic rules for next contacts and intelligent auto-forward/reply". IP.com No. IPCOM000217048D. IP.com Electronic Publication Date: Apr. 30, 2012.

* cited by examiner

MANAGING UNAVAILABILITY NOTICES

BACKGROUND

In the present day, electronic mail systems (i.e., e-mails) often include some kind of auto-response system, for example an "out of office" feature. The out of office feature is often integrated into electronic mail systems, allowing a user to specify a range of dates (i.e., a duration) for which the user is going to be unavailable to access the electronic mail system. When a sending user sends an e-mail within that specified range of dates, the sending user receives an automated e-mail specifying the recipient user is out of the office during that specified range of dates. Typically, the automated e-mail is a generic and template-based e-mail response.

SUMMARY

Embodiments of the present invention disclose a method, computer program product and computer system for managing unavailability notices. A computer-implemented method, carried out by one or more processors, for managing unavailability notices comprises the steps of initializing, by one or more processors, an out of office notice, wherein the out of office notice is associated with a first user of an e-mail service; receiving, by one or more processors, inputs for the out of office notice, wherein the inputs include one or more of: a duration of time selection, alternative contact information, and message content; storing, by one or more processors, the out of office notice with the received inputs; receiving, by one or more processors, a list of one or more user to whom to send an out of office alert notice with the received inputs; and sending, by one or more processors, to the one or more users from the list the out of office alert notice with the received inputs and a reminder function, wherein the reminder function allows for each of the one or more users to receive a reminder about unavailability at another time.

DETAILED DESCRIPTION

Embodiments in accordance with the present invention manage unavailability notices, as well as providing optional actions for a recipient of an unavailability notice. The unavailability notice is established by an unavailable user by initializing an out of office notice, where the out of office notice is associated with the unavailable user of an e-mail service. Embodiments in accordance with the present invention can receive inputs from the unavailable user for the out of office notice, where the inputs include at least a duration of time selection, one or more alternative contact information, and message content, and can receive a list of one or more users to whom to send an out of office alert notice with the received inputs. Embodiments in accordance with the present invention can store the out of office notice with the received inputs, and send, to the one or more users from the list, the out of office alert notice with the received inputs and a reminder function, where the reminder function allows for each of the one or more users to receive a reminder about unavailability at another time. Embodiments of the present invention can also provide an automated response e-mail to recipients, including the out of office notice and additional options such as a forward function, a reply all function, show sent e-mails function, and a refresh of the out of office function.

Figure 1:
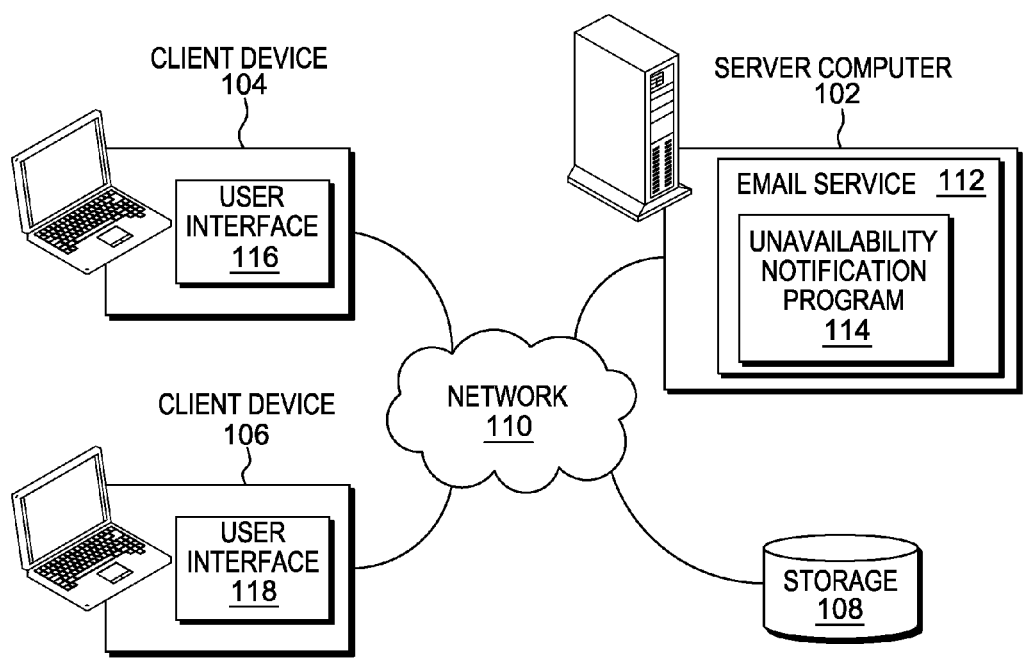
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102 and electronic device 104 all interconnected over network 110.

Server computer 102 may be a desktop computer, a laptop computer, a tablet computer, a specialized computer server, a smartphone, or any other computer-based device known in the art. In certain embodiments, server computer 102 represents a computer system utilizing clustered computers and components that act as a single pool of seamless resources when accessed through network 110, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information.

One or both of client devices 104 and 106 may be a desktop computer, a laptop computer, a tablet computer, a smartphone, or any other computer-based device capable of sending and receiving electronic messages (i.e., e-mail). Client devices 104 and 106 have the ability to communicate with server computer 102, storage 108, or any other computer-based device not illustrated in FIG. 1 via network 110. In general, client devices 104 and 106 represent any programmable electronic devices or combination of programmable electronic devices capable of executing machine readable program instructions and communicating with other computing devices via a network, such as network 110. Client devices 104 and 106, respectively, include user interfaces 116 and 118.

E-mail service 112 residing on server computer 102 has the ability to provide electronic communications (e.g., e-mails and instant messages) between two or more client devices. In this embodiment, e-mail service 112 is based on a store and forward model, where e-mail service 112 can accept, forward, deliver, and store electronic messages from various client devices, such as client devices 104 and 106. E-mail service 112 is a server-based service where client device 104 and client device 106 connect to server computer 102 via network 110 to access services provided by e-mail service 112. Content from e-mail service 112 can be respectively displayed in user interfaces 116 and 118 of client devices 104 and 106.

In this embodiment, unavailability notification program 114 is a feature provided by e-mail service 112. Unavailability notification program 114 has the ability to manage unavailability notifications when a user of a client device, such as client device 104, is unable to access an e-mail account for an extended period of time. For discussion purposes, the user of client device 104 is in a work environment, where the user of client device 104 is considered to be out of the office during extended instances of unavailability. Unavailability notification program 114 can provide automatic responses for the unavailable user of client device 104, where the automatic response has linked options for taking common actions. For example, such linked options can include a forward form selection, a reply form selection, a reminder option selection, display sent e-mails selection, and a refresh out of office selection. The user of client device 104 can send an out of office alert notice in the form of an e-mail to desired users, such as a user of client device 106, upon a selection of an out of office duration, where the out of office alert notice can include the duration of unavailability, information about alternate contacts, as well as a reminder function for when to notify a user when the unavailable user is to depart (i.e., become unavailable) or during the duration of unavailability.

In general, network 110 can be any combination of connections and protocols that can support communications between server computer 102, client device 104, and client device 106. Network 110 can include, for example, a local area network (LAN), a wide area network (WAN), such as the internet, a cellular network, or any combination of the preceding, and can further include wired, wireless, and/or fiber optic connections.

User interfaces 116 and 118, on respective client devices 104 and 106, display information that any one of the processes of unavailability notification program 114 may display to a user. One or both of user interfaces 116 and 118 can be, for example, a graphical user interface (GUI) or a web user interface (WUI) that displays text, documents, web browser windows, user options, application interfaces, and instructions for operation. User interfaces 116 and 118 also have the ability to receive user inputs for unavailability notification program 114.

Figure 2:
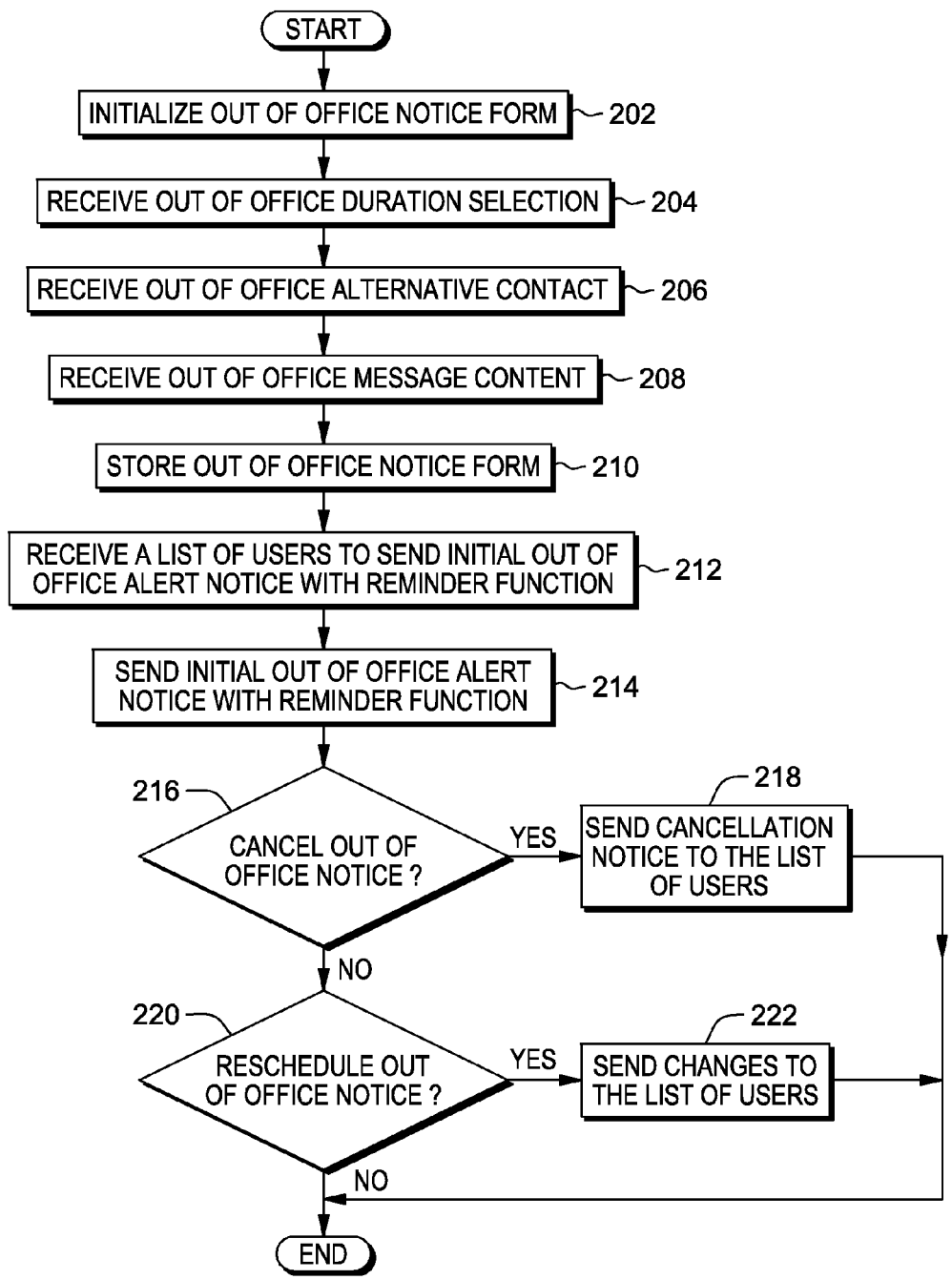
FIG. 2 is a flowchart depicting operational steps of an unavailability notification program establishing an out of office alert notice, in accordance with an embodiment of the present invention.

FIG. 2 is a flowchart depicting operational steps of an unavailability notification program establishing an out of office alert notice, in accordance with an embodiment of the present invention.

Unavailability notification program 114 initializes out of office notice form (step 202). In this embodiment, a user of client device 104 plans to be unavailable for a particular duration. Unavailability notification program 114 can receive a request from a user of client device 104 to initialize an out of office notice form. The out of office notice form is a template-based automated e-mail response, where the automated e-mail response is received by other users (e.g., user of client device 106) trying to send an e-mail to the user of client device 104. Unavailability notification program 114 can initialize the out of office form by displaying the template e-mail response with selectable areas where the user of client device 104 can fill in particular information to personalize the response that other users receive.

Unavailability notification program 114 receives out of office duration selection (step 204). In this embodiment, unavailability notification program 114 can prompt a dialog box containing a calendar where a user can select the duration for which the user will be unavailable. Unavailability notification program 114 can receive a "start date and time" selection, which represents when the out of office notice is sent to other users and unavailability notification program 114 can receive an "end date and time" selection, which represents when the out of office notice will no longer be sent.

Unavailability notification program 114 receives out of office alternative contact (step 206). In this embodiment, unavailability notification program 114 can receive multiple alternative contacts dependent on a particular work item. For example, for the duration a user of client device 104 is not available, any questions or concerns regarding Project A can be directed to the alternative contact user B, and any questions or concerns regarding Project B can be directed to the alternative contact user C. Unavailability notification program 114 has the ability to search and select appropriate alternative contacts from an address book of the user of client device 104 concerning one or more projects.

Unavailability notification program 114 receives out of office message content (step 208). In this embodiment, unavailability notification program 114 can receive personalized message content from a user of client device 104 to include in each automated out of office notice sent to other users. Unavailability notification program 114 can receive a textual message, a file attachment, or a contact phone number from the user of client device 104 as message content for the out of office notice. Unavailability notification program 114 can utilize template-based message content if the user of client device 104 determines to not include any personalized message content. For example, the template-based message content can include a statement including a start date and an end date previously received as a duration selection in step 204.

Unavailability notification program 114 stores out of office notice form (step 210). In this embodiment, unavailability notification program 114 determines to store the out of office form, where the duration provided in the out of office notice form is equivalent to a duration unavailability notification program 114 stores on the out of office notice form. Unavailability notification program 114 can store the out of office notice until the duration provided in the out of office notice form is over, upon which unavailability notification program 114 can delete the out of office notice form.

Unavailability notification program 114 receives a list of users to whom the initial out of office alert notice with reminder function should be sent (step 212). The initial out of office alert notice with the reminder function allows for other user(s) specified by the user of client device 104 to receive the out of office alert notice prior to the start of unavailability. Unavailability notification program 114 can receive a list of one or more users to which to send the initial out of office alert notice, along with a reminder function where each of the one or more users can select when to receive a reminder out of office notice at any point during the duration the user of client device 104 is going to be unavailable. For example, if the duration the user of client device 104 is going to be unavailable is 14 days, unavailability notification program 114 can receive a reminder selection of 10 days. On the 10th day during the duration of unavailability, unavailability notification program 114 can send the out of office notice reminding the one or more users of when the user of client device 104 is to return (i.e., become available). Additionally, the reminder function can receive a reminder (about unavailability of the user of client device 104) at any point before the departure of the user of client device 104. For example, if the departure date for the user of client device 104 is January 10th, unavailability notification program 114 can receive a reminder selection of January 8th. On January 8th, before duration of unavailability, unavailability notification program 114 can send a notification reminding one or more users when the user of client device 104 is to depart (i.e., become unavailable).

Unavailability notification program 114 sends initial out of office alert notice with reminder function (step 214). In this embodiment, unavailability notification program 114 sends the initial out of office alert notice to a list of one or more users previously received in step 212. The initial out of office alert notice can include at least unavailability duration information, message content, alternative contact information, and a reminder function.

Unavailability notification program 114 determines whether to cancel the out of office notice (decision step 216). Unavailability notification program 114 can receive a cancelation of the out of office notice from the user of client device 104 for instances where the user of client device 104 becomes available prior to the start or end of the duration of unavailability. In the event unavailability notification program 114 determines to cancel the out of office notice ("yes" branch, step 216), unavailability notification program 114 sends cancelation notice (steps 218) to the previously received list of users in step 212. In the event unavailability notification program 114 determines not to cancel the out of office notice ("no" branch, step 216), unavailability notification program 114 determines whether to reschedule the out of office notice (decision step 220).

Unavailability notification program 114 sends a cancelation notice to the list of users (step 218). In this embodiment, unavailability notification program 114 can send the cancelation notice of the out of office notice to the initial list of users previously received in step 212. Unavailability notification program 114 can also send the cancelation notice to any other users, not on the previously received list of users, which sent an e-mail to the user of client device 104 during the duration of unavailability. Unavailability notification program 114 can also cancel any reminder functions associated with the out of office notice which was canceled, since the out of office notice is no longer active.

Unavailability notification program 114 determines whether to reschedule the out of office notice (decision step 220). In the event unavailability notification program 114 determines to reschedule the out of office notice ("yes" branch, step 220), unavailability notification program 114 sends changes to the list of users (step 222). In the event unavailability notification program 114 determines not to reschedule the out of office notice ("no" branch, step 220), unavailability notification program 114 ends the operational steps.

Unavailability notification program 114 sends changes to the list of users (step 222). Unavailability notification program 114 can receive changes to the out of office notice from the user of client device 104 and store the changes in the form of a new out of office notice. Changes to the out of office notice can include altering the duration of unavailability, altering the alternative contacts, and altering the message content. Upon unavailability notification program 114 receiving changes to the out of office notice, unavailability notification program 114 can send the changes along with the new out of office notice to the initial list of users received in step 212. Unavailability notification program 114 can also send the changes along with the new out of office notice to any other users, not on the previously received list of users, which sent an e-mail to the user of client device 104 during the duration of unavailability.

Unavailability notification program 114 can also reschedule any reminder functions associated with the rescheduled out of office notice that are appropriate due to the out of office notice being rescheduled.

Figure 3:
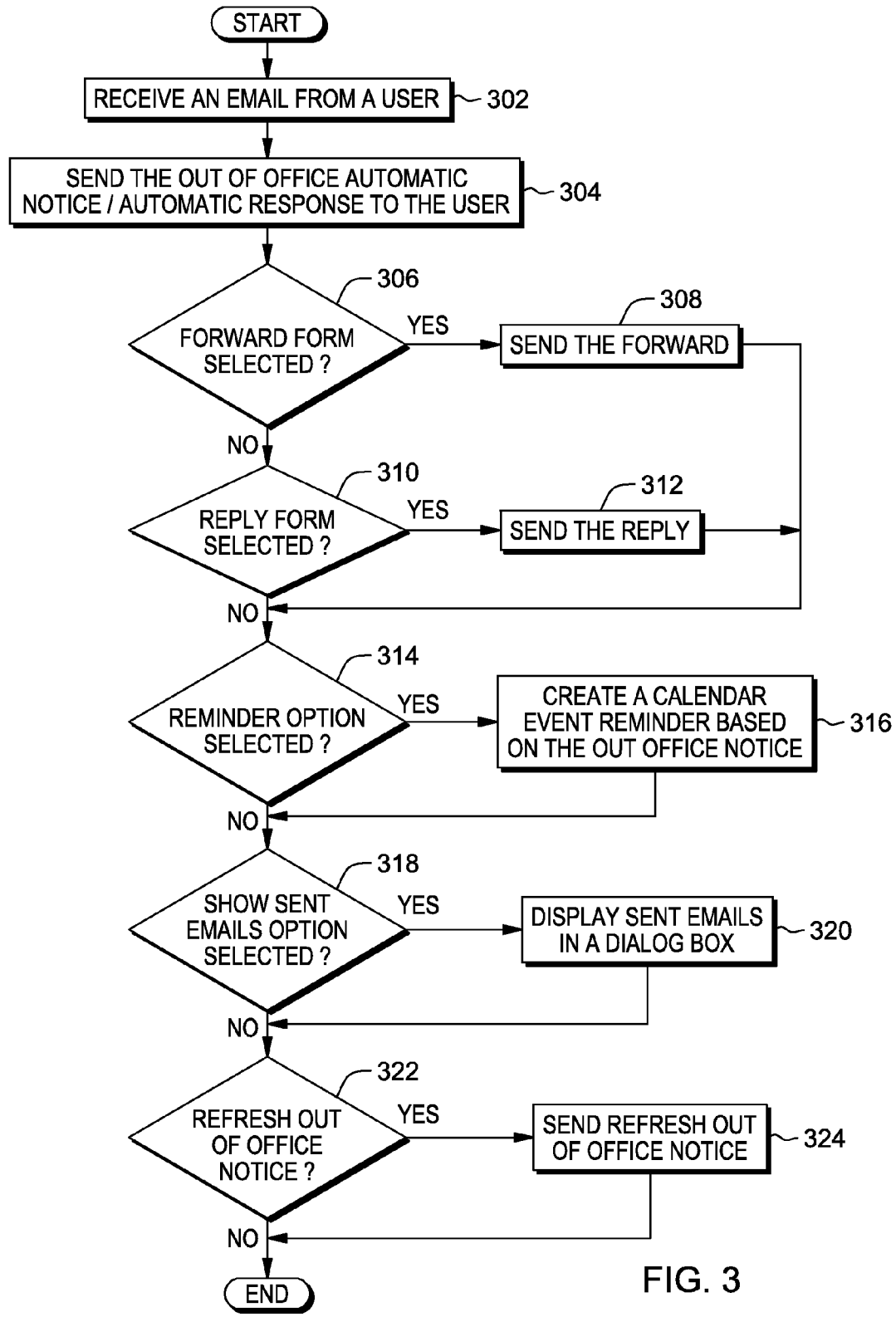
FIG. 3 is a flowchart depicting operational steps of an unavailability notification program, in accordance with one embodiment of the present invention.

FIG. 3 is a flowchart depicting operational steps of an unavailability notification program 114, in accordance with one embodiment of the present invention.

Unavailability notification program 114 receives an e-mail from a user (step 302). For discussion purposes, the user of client device 106 sent the e-mail to the user of client device 104, where the user of client device 104 is unavailable for a duration of time. In this embodiment, unavailability notification program 114 receives an e-mail from a user during the duration for which the user of client device 104 is unavailable. Unavailability notification program 114 can store the e-mail received for the user of client device 104 to view at a later time, and unavailability notification program 114 can create a list of e-mails based on the sending user.

Unavailability notification program 114 sends the out of office automatic notice/automatic response to the user (step 304). Unavailability notification program 114 can determine the e-mail address of the user that sent the e-mail, and send the out of office automatic notice/automatic response in the form of a reply e-mail. The out of office automatic response which unavailability notification program 114 sends can contain a duration of unavailability, message content, alternative contacts, a refresh out of office notice option, a forward option, a reply all option, show sent e-mails option, and reminder function. The refresh out of office notice option allows for the user receiving the out of office automatic notice/automatic response to receive an e-mail a set number of days into the duration of unavailability, as a reminder of when the user of client device 104 is going to be available. The forward option allows for the user to forward the original e-mail, which unavailability notification program 114 received in step 302, to one or more alternative contacts provided in the out of office notice. The reply all option allows for the user to reply to all the recipients of the original e-mail which unavailability notification program 114 received in step 302. The show sent e-mails option allows for the user to view all the e-mails sent to the user of client device 104 during the duration of unavailability.

Unavailability notification program 114 determines whether the forward form is selected (decision step 306). In the event unavailability notification program 114 determines the forward form is selected ("yes" branch, step 306), unavailability notification program 114 sends the forward (step 308). In the event unavailability notification program 114 determines the forward form is not selected ("no" branch, step 306), unavailability notification program 114 determines whether the reply form is selected (decision step 310).

Unavailability notification program 114 sends the forward (step 308). In this embodiment, unavailability notification program 114 sends the e-mail received in step 302 to the alternative contact associated with the forward e-mail option. The out of office notice can have one or more alternative contacts for one or more projects previously established by the user of client device 104. For example, Alternative Contact A for Project A has a forward option where unavailability notification program 114 can forward the received e-mail to Alternative Contact A, since the e-mail pertains to Project A.

Unavailability notification program 114 determines whether the reply form is selected (decision step 310). In the event unavailability notification program 114 determines the reply form is selected ("yes" branch, step 310), unavailability notification program 114 sends the reply (step 312). In the event unavailability notification program 114 determines the reply form is not selected ("no" branch, step 310), unavailability notification program 114 determines whether the reminder option is selected (decision step 314).

Unavailability notification program 114 sends the reply (step 312). In this embodiment, unavailability notification program 114 sends the e-mail received in step 302 to the alternative contacts associated with the reply e-mail option, along with any additional and original recipients of the e-mail. As previously discussed, the out of office notice can have one or more alternative contacts for one or more projects previously established by the user of client device 104. For example, Alternative Contact A for Project A has a reply option where unavailability notification program 114 can send the received e-mail as a reply to Alternative Contact A, since the e-mail pertains to Project A, along with any additional and original recipients of the e-mail. Unavailability notification program 114 can send the out of office notice to the additional recipients who may not have received the original out of office notice. The reply option also allows to send the e-mail as a carbon copy (i.e., Cc) or as a blind carbon copy (i.e., Bcc).

Unavailability notification program 114 determines whether the reminder option is selected (decision step 314). In the event unavailability notification program 114 determines the reminder option is selected ("yes" branch, step 314), unavailability notification program 114 creates a calendar event reminder based on the out of office notice (step 316). In the event unavailability notification program 114 determines the reminder option is not selected ("no" branch, step 314), unavailability notification program 114 determines whether the show sent e-mails option is selected (decision step 318).

Unavailability notification program 114 creates a calendar event reminder based on the out of office notice (step 316). Unavailability notification program 114 can access the personal calendar of the user receiving the out of office notice to create a note specifying the duration of unavailability of the user of client device 104. Unavailability notification program 114 can create a single day entry for the return date of the user of client device 104, where that entry includes the out of office notice sent to the user from which unavailability notification program 114 received the e-mail in step 302. In the event unavailability notification program 114 determines the out of office notice has been rescheduled or canceled, unavailability notification program 114 has the ability to access the calendar, for every user that had the calendar event reminder created, to either alter the calendar event reminder or cancel the calendar event reminder.

Unavailability notification program 114 determines whether the show sent e-mails option is selected (decision step 318). In the event unavailability notification program 114 determines the show sent e-mails option is selected ("yes" branch, step 318), unavailability notification program 114 displays sent e-mails in a dialog box (step 320). In the event unavailability notification program 114 determines the show sent e-mails option is not selected ("no" branch, step 318), unavailability notification program 114 determines whether to refresh the out of office notice (decision step 322).

Unavailability notification program 114 displays sent e-mails in a dialog box (step 320). Unavailability notification program 114 has the ability to prompt a dialog box for the user of client device 106 to view, where the dialog box includes a list and a link to each e-mail sent to the user of client device 104 during the duration of unavailability. There can be an instance where unavailability notification program 114 sends the out of office notice to the user of client device 106 subsequent to the user of client device 106 sending multiple e-mails. Unavailability notification program 114 allows for the user of client device 106 to view the sent e-mails, so that the user of client device 106 can take the appropriate action based on the received out of office notice. There can also be an instance where unavailability notification program 114 creates an out of office notice, where the start of a duration of unavailability has already occurred. For example, unavailability notification program 114 creates an out of office notice on May 14th for a duration of unavailability between and including May 12th and May 22nd. Unavailability notification program 114 has the ability to display the e-mails sent by the user of client device 106 for the days between and including May 12th and May 14th before the user of client device 106 was aware of the unavailability of the user of client device 104.

Unavailability notification program 114 determines whether to refresh the out of office notice (decision step 322). In the event unavailability notification program 114 determines to refresh the out of office notice ("yes" branch, step 322), unavailability notification program 114 sends the refresh out of office notice (step 324). In the event unavailability notification program 114 determines not to refresh the out of office notice ("no" branch, step 322), unavailability notification program 114 ceases operations until another e-mail is received from a user.

Unavailability notification program 114 sends the refresh out of office notice (step 324). Unavailability notification program 114 has the ability to again send the out of office notice reminding the user of client device 106 of the duration of unavailability of the user of client device 104, based either on the next e-mail or duration selected by the user of client device 106. The refresh action allows the user of client device 106 to receive an out of office notification from the user of client device 104 again after the next e-mail, or after a specified hour, day, week, or month, if user of client device 106 sends a new e-mail to the user of client device 104. If a notification is generated on the next "e-mail", the 'forward/reply all' actions on it will map to the recent e-mail that triggered the notification. If user of client device 106 chooses to refresh the out of office notification in the next specified hour, day, week, or month, then 'forward/reply all' actions will work only on the most recent e-mails sent by the user of client device 106 to the user of client device 104, during that duration of the specified hour, day, week, or month, for which the out of office notice is generated. If there are multiple e-mails sent in that duration, then the user of client device 106 can choose to use the show sent e-mails action, which will list sent e-mails in that duration.

Figure 4A:
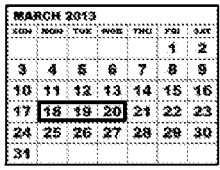
FIG. 4A illustrates an example of an out of office automatic notice/automatic response with linked options, in accordance with one embodiment of the present invention.

FIG. 4A illustrates an example of an out of office automatic notice/automatic response with linked options, in accordance with one embodiment of the present invention.

In this example, User B sends an e-mail to User A, where User A is unavailable for a specified duration, March 18th through March 20th. Unavailability notification program 114 sends automated response e-mail 402 to User B on behalf of User A. Section 404 of automated response e-mail 402 includes the sending and receiving users, as well as a template-based subject heading for the e-mail "Auto-User A is out of office". Section 406 includes a forward option and reply all option for each alternative contact associated with each query or issue. For example, issues pertaining to "Cars" have an alternative contact, User X, and issues pertaining to "Bikes" have an alternative contact, User Y. Section 408 includes a show sent e-mails option and a refresh out of office notification option. The show sent e-mails option allows for User B to view e-mails sent to User A during the duration of unavailability. The refresh out of office notification option allows for User B to select when unavailability notification program 114 is to re-send automated out of office response e-mail 402 based on the hour, day, week, and month. The out of office response can also include a "Remind Me" option which allows for the user to create a calendar event reminder based on the out of office notice. The dates highlighted in the calendar in automated response e-mail 402 represent the dates for which User A is unavailable.

Figure 4B:
FIG. 4B illustrates an example of an out of office alert notice upon a selection of out of office duration, in accordance with one embodiment of the present invention.

FIG. 4B illustrates an example of an out of office automatic alert notice upon a selection of out of office duration, in accordance with one embodiment of the present invention.

In this example, unavailability notification program 114 sends initial out of office alert notice 410 with a reminder function to User C, User D, and a group of Users (i.e., Team A) on behalf of User A, where User A previously initialized an out of office form. Section 412 of initial out of office alert notice 410 includes the sending and receiving user, as well as a template-based subject heading for the e-mail "OOO (Out of Office) Plan of User A". Section 414 includes alternative contacts associated with each query or issue, and the manager information for User A. For example, issues pertaining to "Cars" have an alternative contact, User X, and issues pertaining to "Bikes" have an alternative contact, User Y. Section 416 includes a reminder function, where either one or all of User C, User D, and Team A can select a day or time for which unavailability notification program 114 is to send a notification reminding User C, User D, and Team A of the start of duration of unavailability of User A. The dates highlighted in the calendar in initial out of office alert notice 410 represent the dates for which User A is unavailable.

Figure 5:
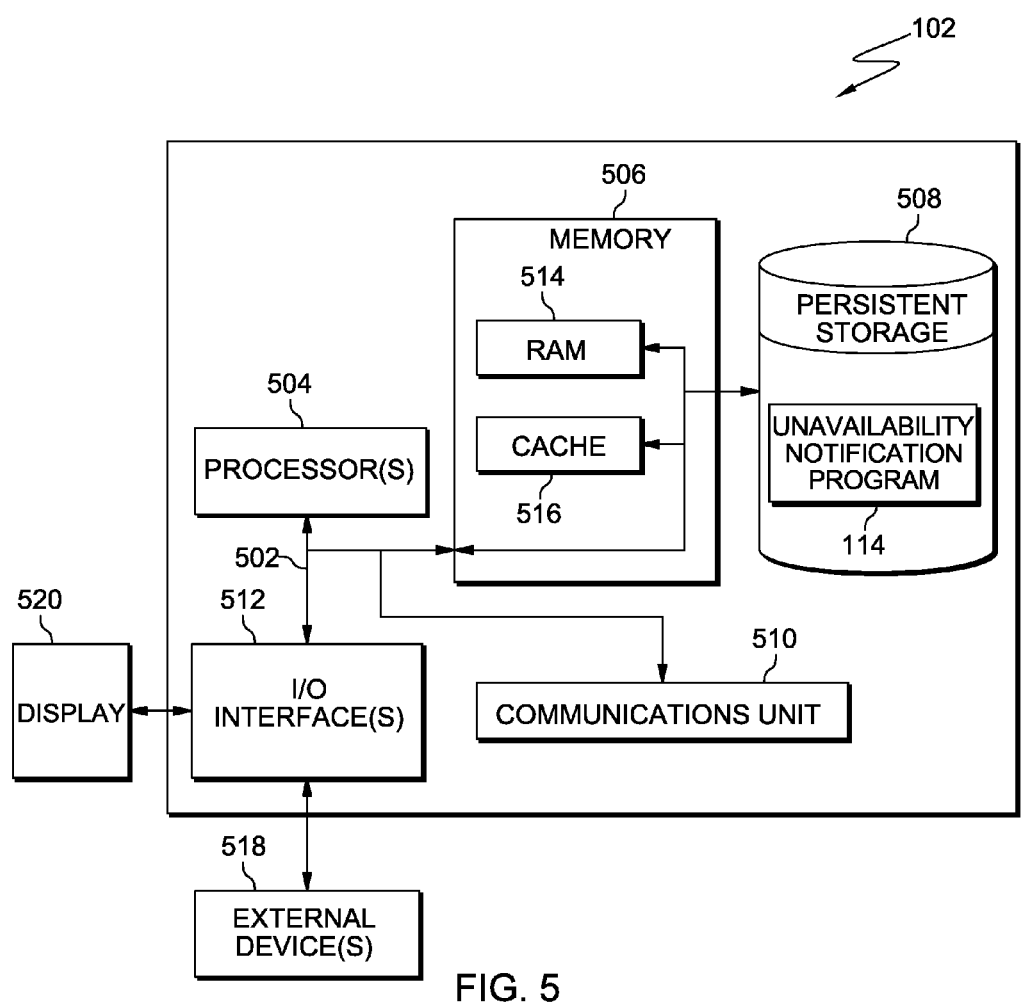
FIG. 5 is a block diagram of components of a computer system, such as the computer server of FIG. 1, in accordance with an embodiment of the present invention.

FIG. 5 depicts a block diagram of components of a computer, such as server computer 102, hosting unavailability notification program 114 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 102 include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. In general, memory 506 can include any suitable volatile or non-volatile computer readable storage device.

Unavailability notification program 114 is stored in persistent storage 508 for execution by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including systems and devices within or controlled by server computer 102. In these examples, communications unit 510 includes one or more wireless network interface cards. Communications unit 510 may provide communications through the use of either or both physical and wireless communications links. Computer programs and processes, such as unavailability notification program 114, may be downloaded to persistent storage 508 through communications unit 510, or uploaded to another system through communications unit 510.

I/O interface(s) 512 allows for input and output of data with other devices that may be connected to server computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 may also connect to a display 520. Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing unavailability notices, the method comprising:
   initializing, by one or more processors, an out of office notice, wherein the out of office notice is associated with a first user of an e-mail service;
   receiving, by one or more processors, inputs for the out of office notice, wherein the inputs include one or more of: a duration of time selection, alternative contact information, and message content;
   storing, by one or more processors, the out of office notice with the received inputs;
   receiving, by one or more processors, a list of one or more users to whom to send an out of office alert notice with the received inputs;
   sending, by one or more processors, to the one or more users from the list, the out of office alert notice with the received inputs and a reminder function, wherein the reminder function allows for each of the one or more users to receive a reminder about unavailability at another time, as specified by each of the one or more users, prior to the duration of time selection in the out of office alert notice;

receiving, by one or more processors, an e-mail sent from a second user of the e-mail service to the first user;

sending, by one or more processors, a first out of office notice with the received inputs and a refresh option to the second user, wherein the refresh option allows for the second user to receive the out of office notice in a set duration of time;

responsive to determining the refresh option has been selected, sending, by one or more processors, a second out of office notice with the received inputs and the refresh option to the second user subsequent to completion of the set duration of time; and responsive to receiving a show sent e-mail selection, displaying, by one or more processors, one or more emails sent by the second user during the set duration of time between the first out of office notice and second out of office notice.

2. The method of claim 1, further comprising:

determining, by one or more processors, whether the out of office notice with the received inputs is canceled; and responsive to determining the out of office notice with the received inputs is canceled, sending a cancelation notice to the one or more users from the list.

3. The method of claim 1, further comprising:

determining, by one or more processors, whether the out of office notice with the received inputs is rescheduled; and responsive to determining the out of office notice with the received inputs is rescheduled, sending a reschedule notice to the one or more users from the list.

4. The method of claim 1, further comprising:

determining, by one or more processors, a reminder option has been selected, wherein the reminder option provides the out of office notice during the duration of time selection; and creating, by one or more processors, a calendar event reminder, wherein the calendar event reminder includes at least the out of office notice.

5. The method of claim 1, further comprising:

determining, by one or more processors, a forward option has been selected, wherein the forward option forwards an e-mail received from the second user to an alternative contact; and sending, by one or more processors, the e-mail received from the second user to the alternative contact.

6. A computer program product for managing unavailability notices, the computer program product comprising:

one or more computer readable tangible storage media and program instructions stored on at least one of the one or more storage media, wherein the one or more storage media are not transitory signals per se, the program instructions comprising:

program instructions to initialize an out of office notice, wherein the out of office notice is associated with a first user of an e-mail service;

program instructions to receive inputs for the out of office notice, wherein the inputs include one or more of: a duration of time selection, alternative contact information, and message content;

program instructions to store the out of office notice with the received inputs;

program instructions to receive a list of one or more user to whom to send an out of office alert notice with the received inputs;

program instructions to send to the one or more users from the list the out of office alert notice with the received inputs and a reminder function, wherein the reminder function allows for each of the one or more users to receive a reminder about unavailability at another time, as specified by each of the one or more users, prior to the duration of time selection in the out of office alert notice;

program instructions to receive an e-mail sent from a second user of the e-mail service to the first user;

program instructions to send a first out of office notice with the received inputs and a refresh option to the second user, wherein the refresh option allows for the second user to receive the out of office notice in a set duration of time;

program instructions to, responsive to determining the refresh option has been selected, send a second out of office notice with the received inputs and the refresh option to the second user subsequent to completion of the set duration of time; and program instructions to, responsive to receiving a show sent e-mail selection, display one or more emails sent by the second user during the set duration of time between the first out of office notice and second out of office notice.

7. The computer program product of claim 6, further comprising program instructions, stored on the one or more computer readable storage media, which when executed by a processor, cause the processor to:

determine whether the out of office notice with the received inputs is canceled; and responsive to determining the out of office notice with the received inputs is canceled, send a cancelation notice to the one or more users from the list.

8. The computer program product of claim 6, further comprising program instructions, stored on the one or more computer readable storage media, which when executed by a processor, cause the processor to:

determine whether the out of office notice with the received inputs is rescheduled; and responsive to determining the out of office notice with the received inputs is rescheduled, send a reschedule notice to the one or more users from the list.

9. The computer program product of claim 6, further comprising program instructions, stored on the one or more computer readable storage media, which when executed by a processor, cause the processor to:

determine a reminder option has been selected, wherein the reminder option provides the out of office notice during the duration of time selection; and create a calendar event reminder, wherein the calendar event reminder includes at least the out of office notice.

10. The computer program product of claim 6, further comprising program instructions, stored on the one or more computer readable storage media, which when executed by a processor, cause the processor to:

determine a forward option has been selected, wherein the forward option forwards an e-mail received from the second user to an alternative contact; and send the e-mail received from the second user to the alternative contact.

11. A computer system for managing unavailability notices, the computer system comprising:

one or more computer processors;

one or more computer readable storage media, wherein the one or more storage media are not transitory signals per se; and program instructions stored on the computer readable storage media for execution by at least one of the one or more computer processors, which when executed by a processor, cause the processor to:

initialize an out of office notice, wherein the out of office notice is associated with a first user of an e-mail service;

receive inputs for the out of office notice, wherein the inputs include one or more of: a duration of time selection, alternative contact information, and message content;

store the out of office notice with the received inputs;

receive a list of one or more user to whom to send an out of office alert notice with the received inputs;

send to the one or more users from the list the out of office alert notice with the received inputs and a reminder function, wherein the reminder function allows for each of the one or more users to receive a reminder about unavailability at another time, as specified by each of the one or more users, prior to the duration of time selection in the out of office alert notice;

receive an e-mail sent from a second user of the e-mail service to the first user;

send a first out of office notice with the received inputs and a refresh option to the second user, wherein the refresh option allows for the second user to receive the out of office notice in a set duration of time;

responsive to determining the refresh option has been selected, send a second out of office notice with the received inputs and the refresh option to the second user subsequent to completion of the set duration of time; and responsive to receiving a show sent e-mail selection, display one or more emails sent by the second user during the set duration of time between the first out of office notice and second out of office notice.

12. The computer system of claim 11, further comprising program instructions, stored on the one or more computer readable storage media, which when executed by a processor, cause the processor to:
determine whether the out of office notice with received inputs is canceled; and
responsive to determining the out of office notice with received inputs is canceled, send a cancelation notice to the one or more users from the list.

13. The computer system of claim 11, further comprising program instructions, stored on the one or more computer readable storage media, which when executed by a processor, cause the processor to:
determine whether the out of office notice with the received inputs is rescheduled; and
responsive to determining the out of office notice with the received inputs is rescheduled, send a reschedule notice to the one or more users from the list.

14. The computer system of claim 11, further comprising program instructions, stored on the one or more computer readable storage media, which when executed by a processor, cause the processor to:
determine an reminder option has been selected, wherein the reminder options provide the out of office notice during the duration of time selection; and
create a calendar event reminder, wherein the calendar event reminder includes at least the out of office notice.

15. The computer system of claim 11, further comprising program instructions, stored on the one or more computer readable storage media, which when executed by a processor, cause the processor to:
determine a forward option has been selected, wherein the forward option forwards an e-mail received from the second user to an alternative contact; and
send the e-mail received from the second user to the alternative contact.

* * * * *